United States Patent
Wu et al.

(10) Patent No.: US 8,937,684 B2
(45) Date of Patent: Jan. 20, 2015

(54) VOLTAGE LEVEL CONTROL CIRCUIT AND ASSOCIATED METHOD

(75) Inventors: Shao-Chih Wu, ChuPei (TW); Chien-Hung Chen, ChuPei (TW); Wei-Shu Wong, ChuPei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 0 days.

(21) Appl. No.: 13/316,749

(22) Filed: Dec. 12, 2011

(65) Prior Publication Data

US 2012/0154680 A1    Jun. 21, 2012

(30) Foreign Application Priority Data

Dec. 17, 2010 (TW) ................. 99144408 A (51) Int. Cl.
*H04N 5/06* (2006.01)
*H04N 5/08* (2006.01)

(52) U.S. Cl.
CPC ..................... *H04N 5/08* (2013.01)
USPC ........................................... 348/521

(58) Field of Classification Search
CPC ....................................... H04N 5/06
USPC ............................................. 375/345
See application file for complete search history.

(56) References Cited

U.S. PATENT DOCUMENTS

2011/0235758 A1* 9/2011 Khoini-Poorfard et al. .. 375/345

* cited by examiner

*Primary Examiner* — Jefferey Harold
*Assistant Examiner* — Sihar Karwan
(74) *Attorney, Agent, or Firm* — Edell, Shapiro & Finnan, LLC (57) ABSTRACT

A voltage level control circuit controls a target slicing voltage level to slice a video signal by a target circuit. The voltage level control circuit includes a slicing circuit for sequentially slicing the video signal by a plurality of slicing voltage levels to correspondingly generate a plurality of first clock signals; a detection circuit for respectively detecting a plurality of phase differences between the first clock signals and a plurality of corresponding second clock signals to generate a plurality of detection signals; an oscillating circuit for generating the second clock signals according to the detection signals, respectively; and an adjusting circuit for determining whether to adjust the target slicing voltage level according to the detection signals corresponding to the slicing voltage levels.

12 Claims, 6 Drawing Sheets

VOLTAGE LEVEL CONTROL CIRCUIT AND ASSOCIATED METHOD

CROSS REFERENCE TO RELATED PATENT APPLICATION

This patent application is based on Taiwan, R.O.C. patent application No. 099144408 filed on Dec. 17, 2010.

FIELD OF THE INVENTION

The present invention relates to a voltage level control circuit and associated method, and more particularly, to a control circuit and associated method capable of controlling a target slicing voltage level implemented by a target circuit for slicing a video signal.

BACKGROUND OF THE INVENTION

Figure 1:
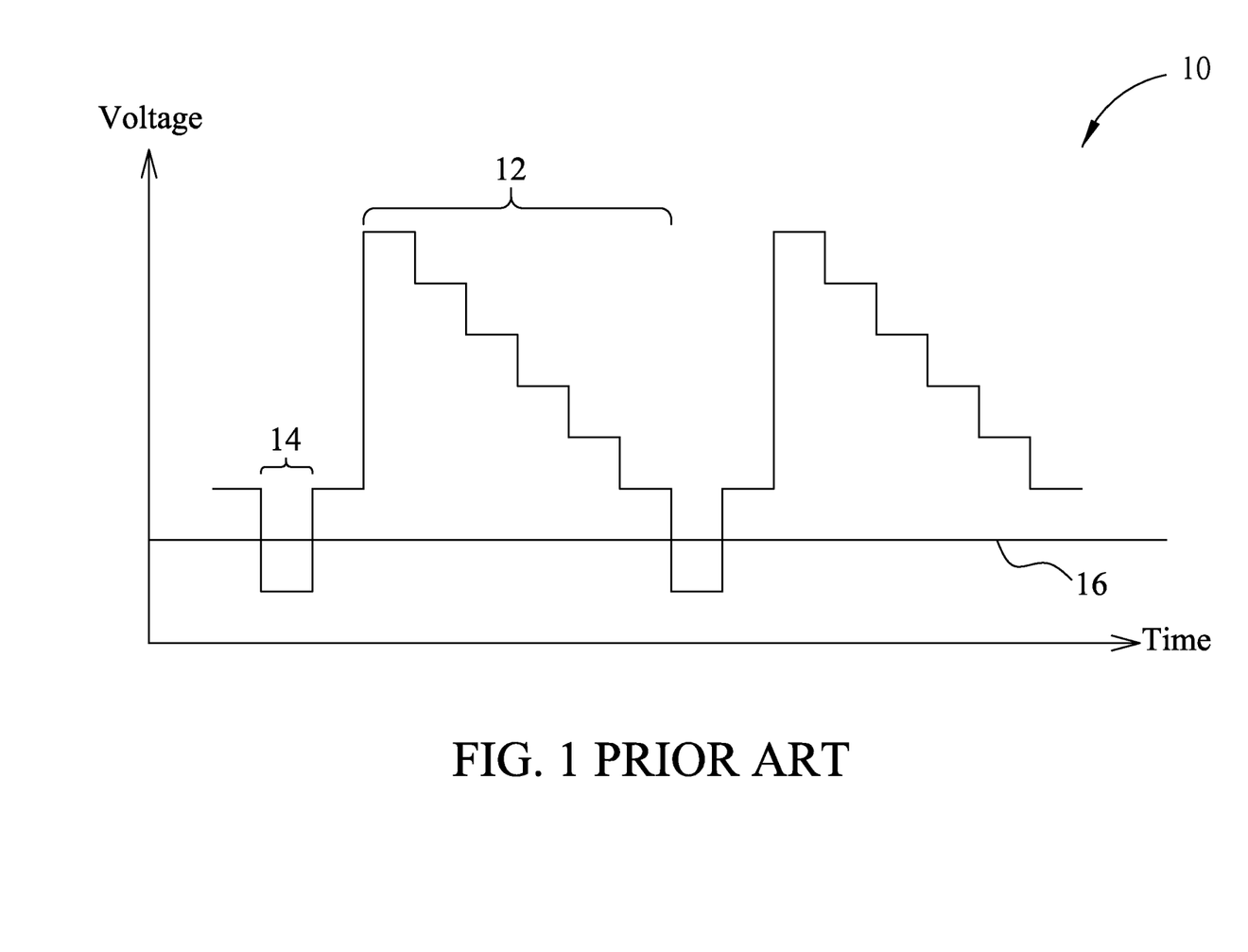
FIG. 1 is timing sequence of a conventional monochrome composite video blanking sync signal.

FIG. 1 shows timing sequence of a conventional monochrome composite video blanking sync signal 10, which mainly comprises two signal components, i.e., a luminance signal 12 and a horizontal synchronization signal 14. The luminance signal 12 comprises video saturation (luminance) information, and the horizontal synchronization signal 14 controls a display signal scan operation on a screen (or a television screen). Referring to FIG. 1, since a voltage level of the horizontal synchronization signal 14 is lower than that of the luminance 12, a conventional video signal decoder provides a slicing voltage level 16 crossing the horizontal synchronization signal 14, and compares voltage levels of the composite video blanking sync signal 10 with the slicing voltage level 16 to retrieve the horizontal synchronization signal 14 of the composite video blanking sync signal 10. However, since falling edges and rising edges of the horizontal synchronization signal 14 are distorted due to noise interferences occurring in transmission of the composite video blanking sync signal 10, the horizontal synchronization signal retrieved by the conventional video signal decoder is not synchronous with the horizontal synchronization signal 14 thereby creating distortion in a video on the screen. In other words, the distortion is created due to jitter between the horizontal synchronization signal retrieved by the video signal decoder and the horizontal synchronization signal 14, and the jitter is caused by the composite video blanking sync signal 10 disturbed by noise interferences. However, since noises are random signals, it is infeasible to eliminate the noises interferences in transmission of the composite video blanking sync signal 10. Accordingly, a solution for more effectively and accurately retrieving the horizontal synchronization signal 14 of the composite video blanking sync signal 10 to eliminate distortion is in need.

SUMMARY OF THE INVENTION

One object of the present invention is to provide a control method and associated method capable of controlling a target slicing voltage level used to slice a video signal by a target circuit.

According to an embodiment of the present invention, a voltage level control circuit for controlling a target slicing voltage level, used to slice a video signal by a target circuit, comprises a slicing circuit, a detection circuit, an oscillating circuit and an adjusting circuit. The slicing circuit slices the video signal by sequentially adopting a plurality of slicing voltage levels to correspondingly generate a plurality of first clock signals. The detection circuit detects a plurality of phase differences between the first clock signals and a plurality of corresponding second clock signals to generate a plurality of detection signals. The oscillating circuit generates the second clock signals according to the detection signals. The adjusting circuit determines whether to adjust the target slicing voltage level according to the detection signals corresponding to the slicing voltage levels.

According to another embodiment of the present invention, a voltage level control method for controlling a target slicing voltage level, used to slice a video signal by a target circuit comprises slicing the video signal via a slicing circuit by sequentially implementing a plurality of slicing voltage levels to correspondingly generate a plurality of first clock signals; respectively detecting a plurality of phase differences between the first clock signals and a plurality of corresponding second clock signals to generate a plurality of detection signals; respectively generating the second clock signals according to the detection signals; and determining whether to adjust the target slicing voltage level according to the detection signals corresponding to the slicing voltage levels.

DETAILED DESCRIPTION OF THE PREFERRED EMBODIMENT

Figure 2:
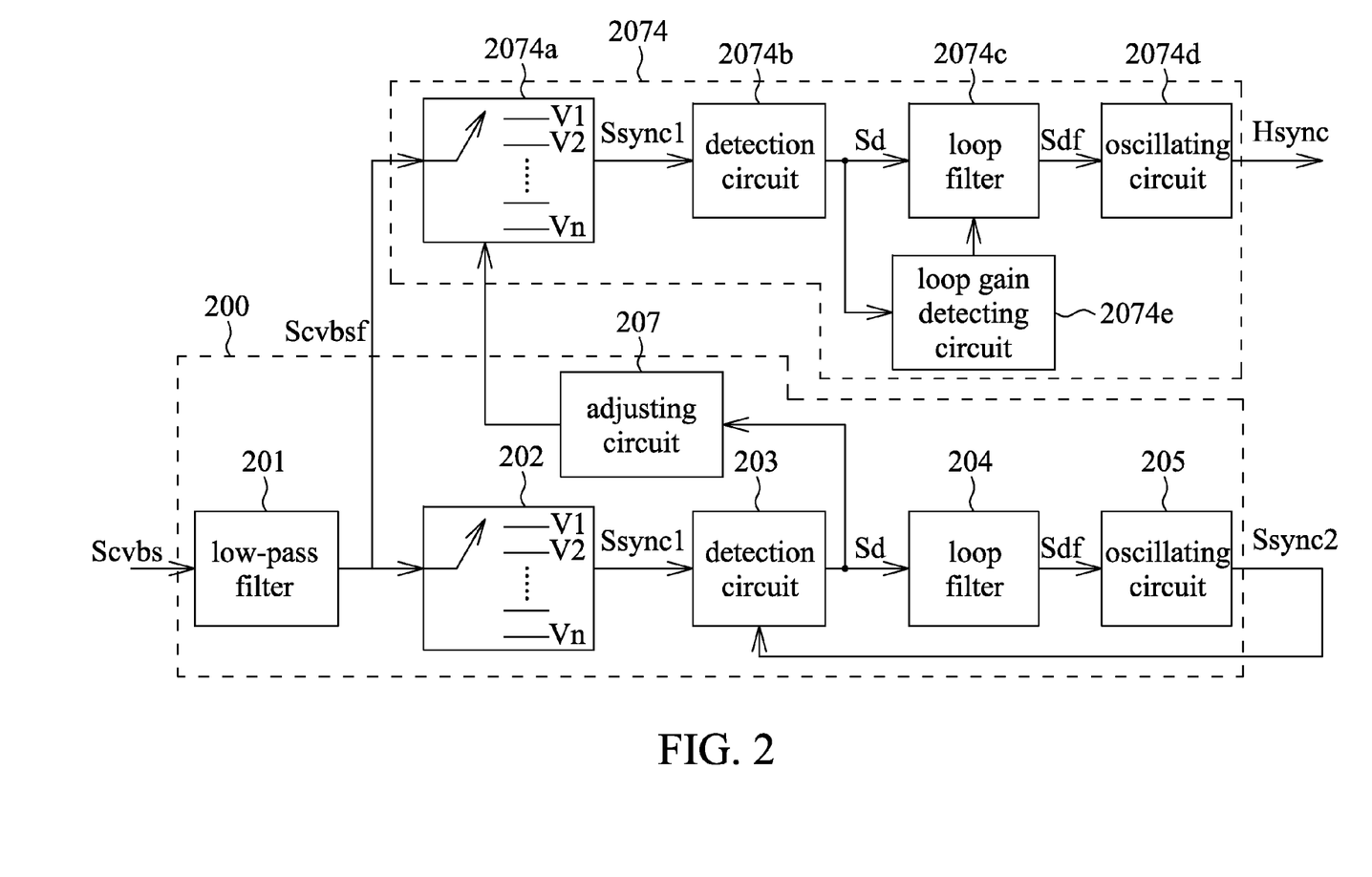
FIG. 2 is a schematic diagram of a voltage level control circuit in accordance with an embodiment of the present invention.

FIG. 2 shows a schematic diagram of a voltage level control circuit 200 in accordance with an embodiment of the present invention. The voltage level control circuit 200 controls a target voltage level Vt implemented by a target circuit 2074 for slicing a video signal Scvbs. In an embodiment, the voltage level control circuit 200 is configured to a video signal decoder that decodes the video signal Scvbs. More specifically, the target circuit 2074, of the video signal decoder, illustrated in FIG. 2, generates a horizontal synchronization clock signal Hsync. The voltage level control circuit 200 comprises a low-pass filter 201, a slicing circuit 202, a detection circuit 203, a loop filter 204, an oscillating circuit 205, and an adjusting circuit 207. The target circuit 2074 comprises a slicing circuit 2074a, a detection circuit 2074b, a loop filter 2074c, an oscillating circuit 2074d, and a loop gain detecting circuit 2074e. The low-pass filter 201 receives and low-pass filters the video signal Scvbs to filter out a luminance signal of high-frequency components of the video signal Scvbs thereby generating a filtered video signal Scvbsf. The slicing circuit 202 coupled to the low-pass filter 201 slices the filtered video signal Scvbsf by sequentially implementing a plurality of slicing voltage levels V1 to Vn to correspondingly generate a plurality of first clock signals Ssync1. The detection circuit 203 coupled to the slicing circuit 202 detects a plurality of phase differences between the first clock signals Ssync1 and a plurality of corresponding second clock signals Ssync2 to generate a plurality of detection signals Sd. The loop filter 204 coupled to the detection circuit 203 performs filtering on the detection signals Sd to generate a plurality of control signals Sdf. The oscillating circuit 205 coupled to the loop filter 204 generates the second clock signals Ssync2 according to the control signals Sdf. The adjusting circuit 207 coupled to the detection circuit 203 determines whether to adjust the target slicing voltage level Vt implemented by the target circuit according to the detection signals Sd corresponding to the slicing voltage levels V1 to Vn, and the adjusting circuit 207 may be coupled to or not coupled to the slicing circuit 202. It is to be noted that, functions of the slicing circuit 2074a, the detection circuit 2074b, the loop filter 2074c and the oscillating circuit 2074d of the target circuit 2074 are similar to those of the slicing circuit 202, the detection circuit 203, the loop filter 204 and the oscillating circuit 205 of the voltage level control circuit 200, and shall not be described for brevity. In addition, the loop gain detection circuit 2074e of the target circuit 2074 is coupled to the loop filter 2074c, and controls element parameters of the loop filter 2074c (e.g., a capacitance value or a resistance value of the loop filter 2074c) according to the detection signals generated by the detection circuit 2074b, so as to adjust a loop gain value formed by the detection circuit 2074b, the loop filter 2074c and the oscillating circuit 2074d.

It is to be noted that, in this embodiment, the video signal Scvbs is a composite video blanking sync signal. The oscillating circuit 205 is implemented by a numerically controlled oscillator (NCO), and the detection circuit 203 is implemented by a phase detector. The second clock signals Ssync2 are regarded as horizontal synchronization clock signals Hsync of the video signal Scvbs.

Figure 3:
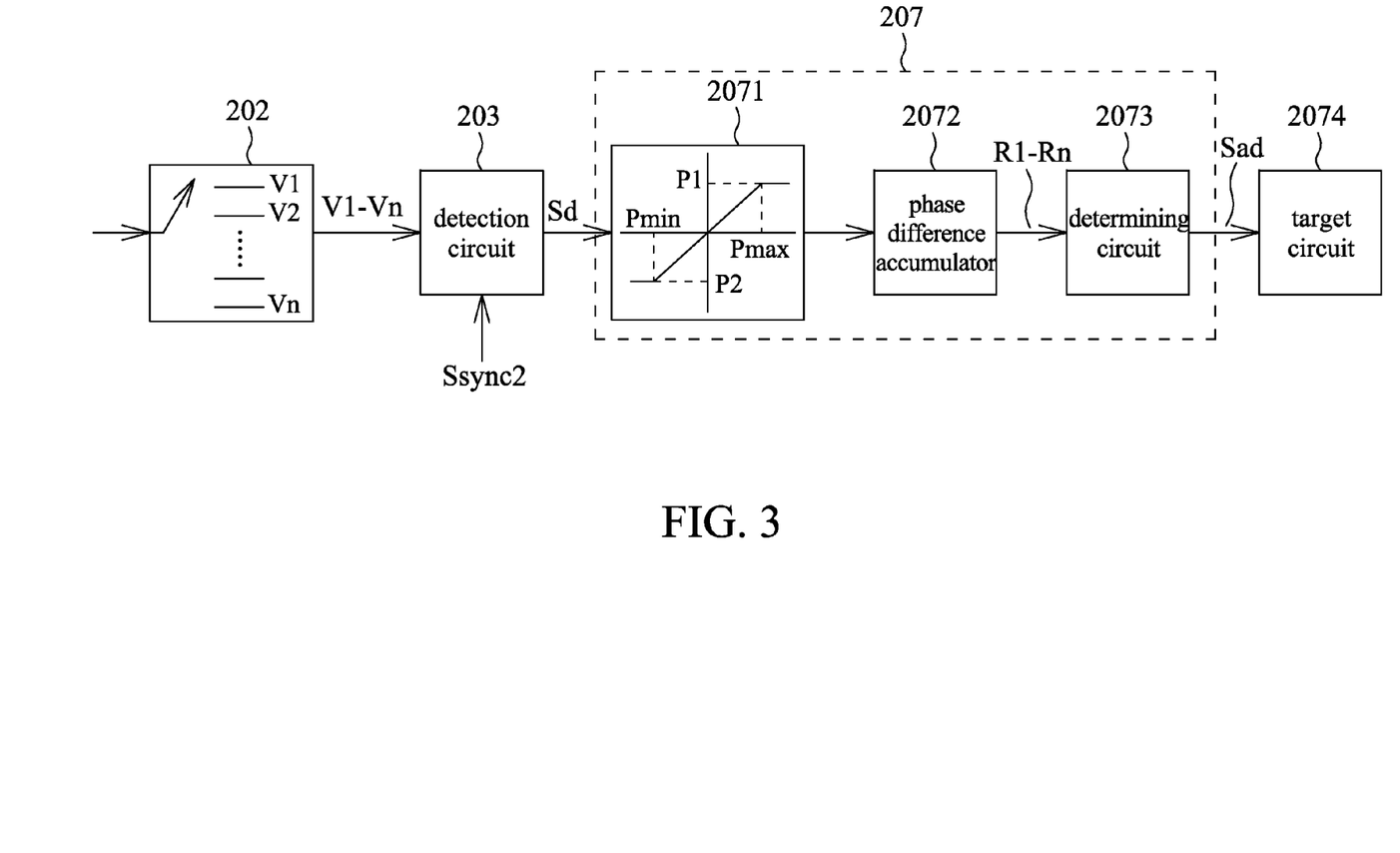
FIG. 3 is a schematic diagram of an adjusting circuit in accordance with an embodiment of the present invention.

FIG. 3 is a schematic diagram of the adjusting circuit 207 in accordance with an embodiment of the present invention. The adjusting circuit 207 comprises a limitation circuit 2071, a phase difference accumulator 2072, and a determining circuit 2073. The limitation circuit 2071, coupled between the detection circuit 203 and the phase difference accumulator 2072, sets phase differences higher than an upper limit value Pmax as a first predetermined phase difference P1 when the phase differences detected by the detection circuit 203 are higher than the predetermined upper limit value Pmax, and the first predetermined phase difference P1 is transmitted to the phase difference accumulator 2072. When the phase differences detected by the detection circuit 203 are lower than a predetermined lower limit value Pmin, the phase differences lower than the lower limit value Pmin are set as a second predetermined phase difference P2 that is outputted to the phase difference accumulator 2072. Accordingly, the limitation circuit 2071 limits the phase differences between the first predetermined phase difference P1 and the second predetermined phase difference P2 to avoid undesired affection of calculation results of subsequent circuits resulting from dramatic variations of the phase differences generated by the detection circuit 203 due to noise interferences. When the slicing circuit 202 slices the video signal Scvbs by the plurality of different slicing voltage levels V1 to Vn, the phase differences between the first clock signals Ssync1 and the second clock signals Ssync2 are accumulated by the phase difference accumulator 2072 to generate a plurality of phase difference accumulation results R1 to Rn respectively corresponding to the slicing voltage levels V1 to Vn. The determining circuit 2073, coupled to the phase difference accumulator 2072, selectively generates an adjustment signal Sad to the target circuit 2074 according to the phase difference accumulation results R1 to Rn and a specific phase difference accumulation value, so as to determine whether to adjust the target slicing voltage level Vt. The specific phase difference accumulation value corresponds to the target slicing voltage level Vt currently implemented by the slicing circuit 2074a of the target circuit. It is to be noted that, the slicing circuit 202, the detection circuit 203 and the target circuit 2074 are illustrated in FIG. 3 to gain a better understanding of the spirit of the present invention. In addition, in this embodiment, with respect to each of the plurality of slicing voltage levels V1 to Vn, the phase difference accumulator 2072 continuously accumulates a first predetermined number of fields of the video signal Scvbs and a second predetermined number of horizontal lines of each field. In other words, instead of accumulating phase differences created by each horizontal line of each field, the phase difference accumulator 2072 only accumulates phase differences created by the second predetermined number of horizontal lines of each of the first predetermined number of fields of the video signal Scvbs to reduce memory space occupied by the voltage level control circuit 200. For example, supporting that the first predetermined number is 25, the second predetermined number is 50, and each field has 500 horizontal lines, with respect to each slicing voltage level, the phase difference accumulator 2072 continuously accumulates phase differences between the first clock signals Ssync1 and the second clock signals Ssync2 during a time for 1250(25*50=1250) horizontal lines to generate corresponding phase difference accumulation results.

Figure 4:
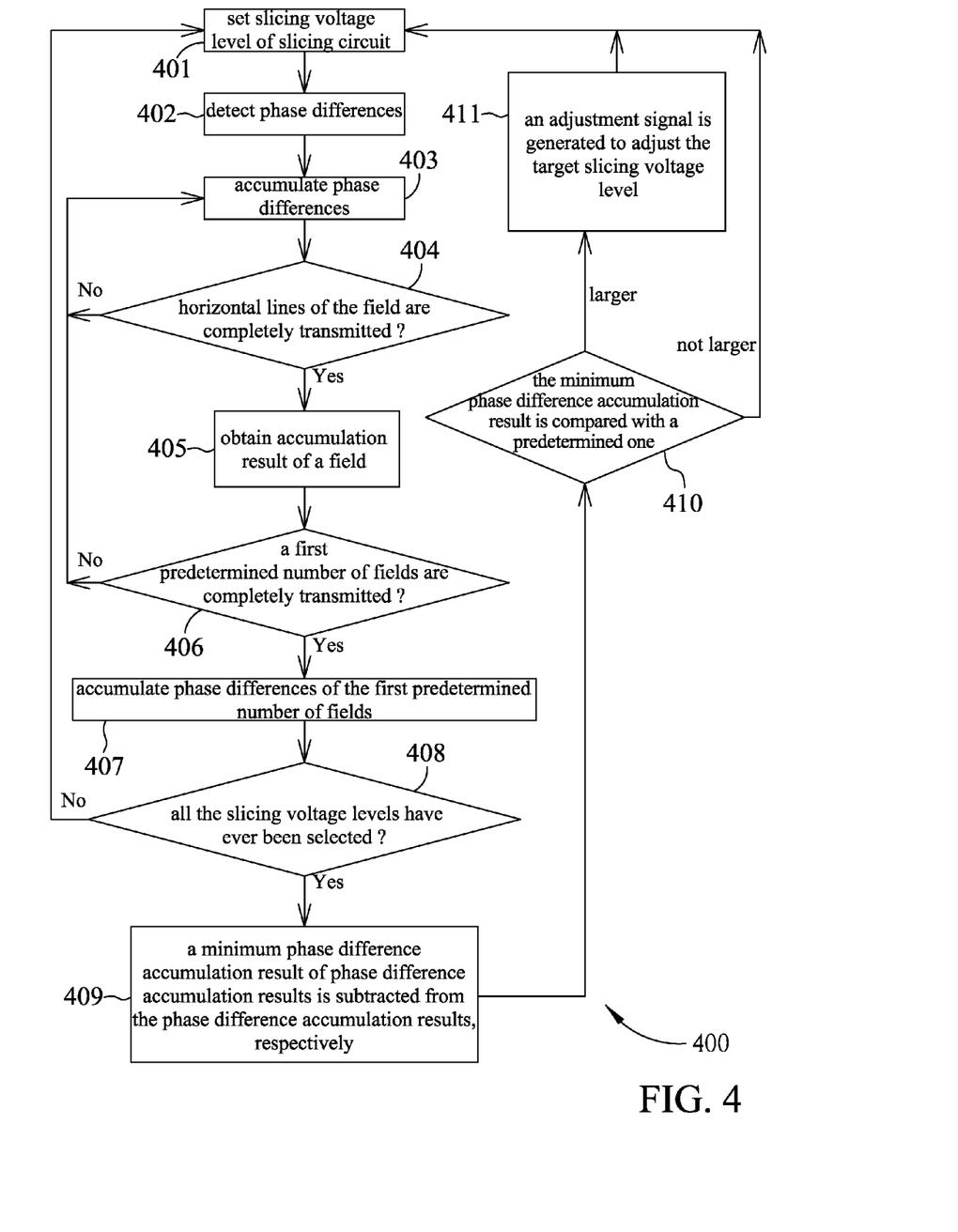
FIG. 4 is a flow chart of a method for controlling by a voltage level control circuit a target slicing voltage level implemented by a target circuit for slicing a video signal in accordance with an embodiment of the present invention.

In this embodiment, an operating method for the voltage level control circuit 200 can be illustrated in detail with reference to FIG. 4, which shows a flow chart of a method 400 for controlling a target slicing voltage level Vt implemented by the slicing circuit 2074a of the target circuit 2074 for slicing a video signal Scvbs in accordance with an embodiment of the present invention. The steps in the flow chart need not be executed as the sequence shown in FIG. 4 nor be successive, provided that the same result is substantially achieved; that is to say, the steps in FIG. 4 can be interleaved with other steps.

The method 400 comprises steps below. In Step 401, a filtered video signal Scvbsf is sliced by the slicing circuit 202 via one of a plurality of slicing voltage levels V1 to Vn (e.g., the first slicing voltage level V1) to generate a first clock signal Ssync1. In Step 402, phase differences between the first clock signal Ssync1 and the output clock signal Ssync2 are detected by the detection circuit 203 to generate a detection signal Sd. In Step 403, phase differences between the first clock signal Ssync1 and the second clock signal Ssync2 corresponding to one field are accumulated by the phase difference accumulator 2072. In Step 404, it is determined whether a second predetermined number of horizontal lines of the field are completely transmitted. When the determination result of Step 404 is positive, the flow proceeds to Step 405; otherwise, the flow returns to Step 403. In Step 405, a phase difference accumulation result of the field corresponding to the slicing voltage level is generated. In Step 406, it is determined whether a first predetermined number of fields are completely transmitted. When the determination result of Step 406 is positive, the flow proceeds to Step 407; otherwise, the flow returns to Step 403. In Step 407, the phase differences of the first predetermined number of fields corresponding to the slicing voltage level (e.g., the first slicing voltage level V1) are accumulated to generate a first phase difference accumulation result R1, for example. In Step 408, it is determined whether all the slicing voltage levels V1 to Vn of the slicing circuit 202 have ever been selected. When the determination result of Step 408 is positive, the flow proceeds to Step 409; otherwise, the flow returns to Step 401. In Step 409, a minimum phase difference accumulation result of the phase difference accumulation results R1 to Rn is subtracted from the phase difference accumulation results R1 to Rn, respectively, so as to obtain differences between each of the phase difference accumulation results R1 to Rn and the minimum phase difference accumulation result. In Step 410, the minimum phase difference accumulation result is compared with a specific phase difference accumulation value. When a difference between the minimum phase difference accumulation result and the specific phase difference accumulation value is larger than a predetermined threshold, the flow proceeds to Step 411; otherwise, the flow returns to Step 401. The specific phase difference accumulation value corresponds to a target slicing voltage level currently implemented by the target circuit 2074. In Step 411, an adjustment signal Sad is generated to adjust the target slicing voltage level Vt to the slicing voltage level corresponding to the minimum phase difference accumulation result.

Figure 5:
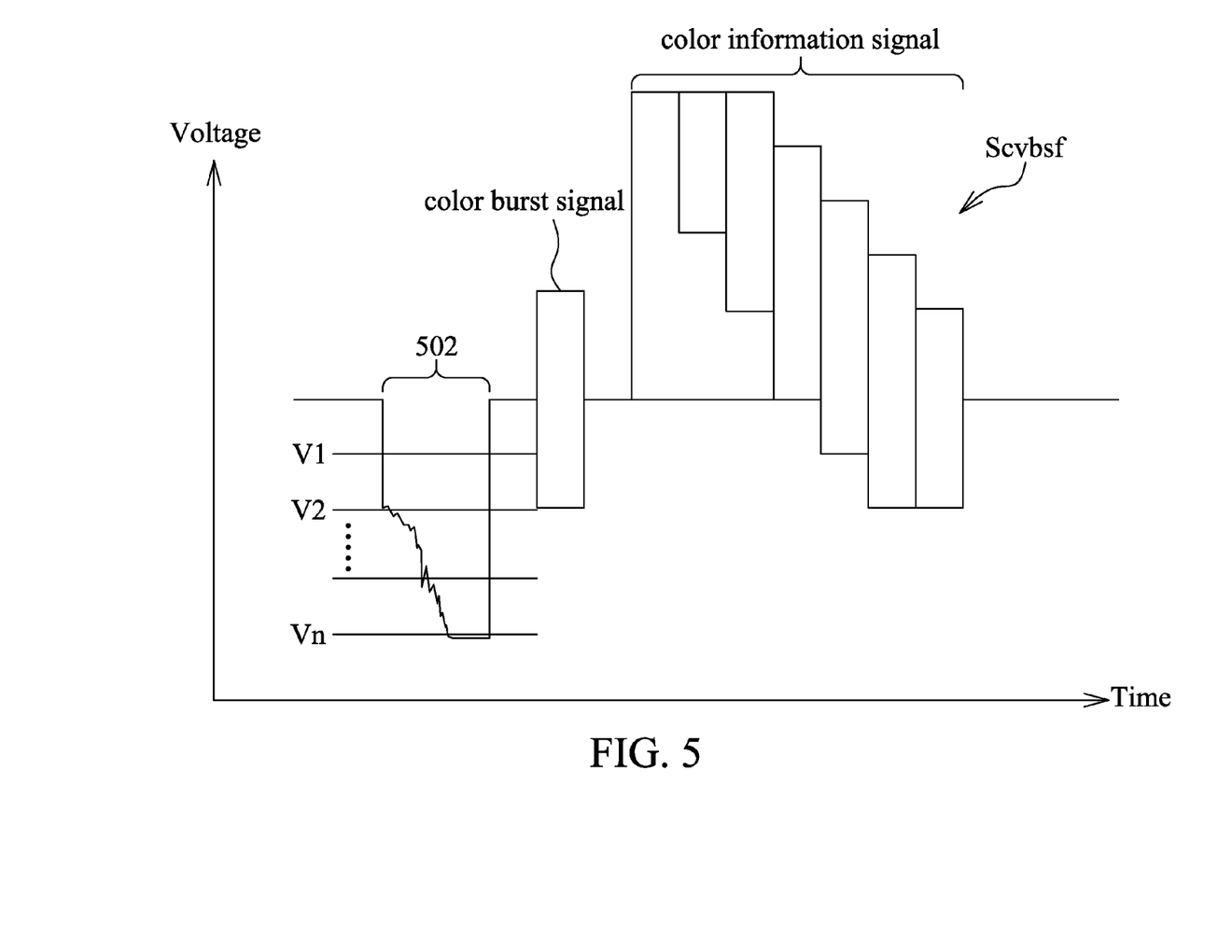
FIG. 5 is timing sequence of a filtered video signal of a voltage level control circuit and a plurality of different slicing voltage levels in accordance with an embodiment of the present invention.
Figure 6:
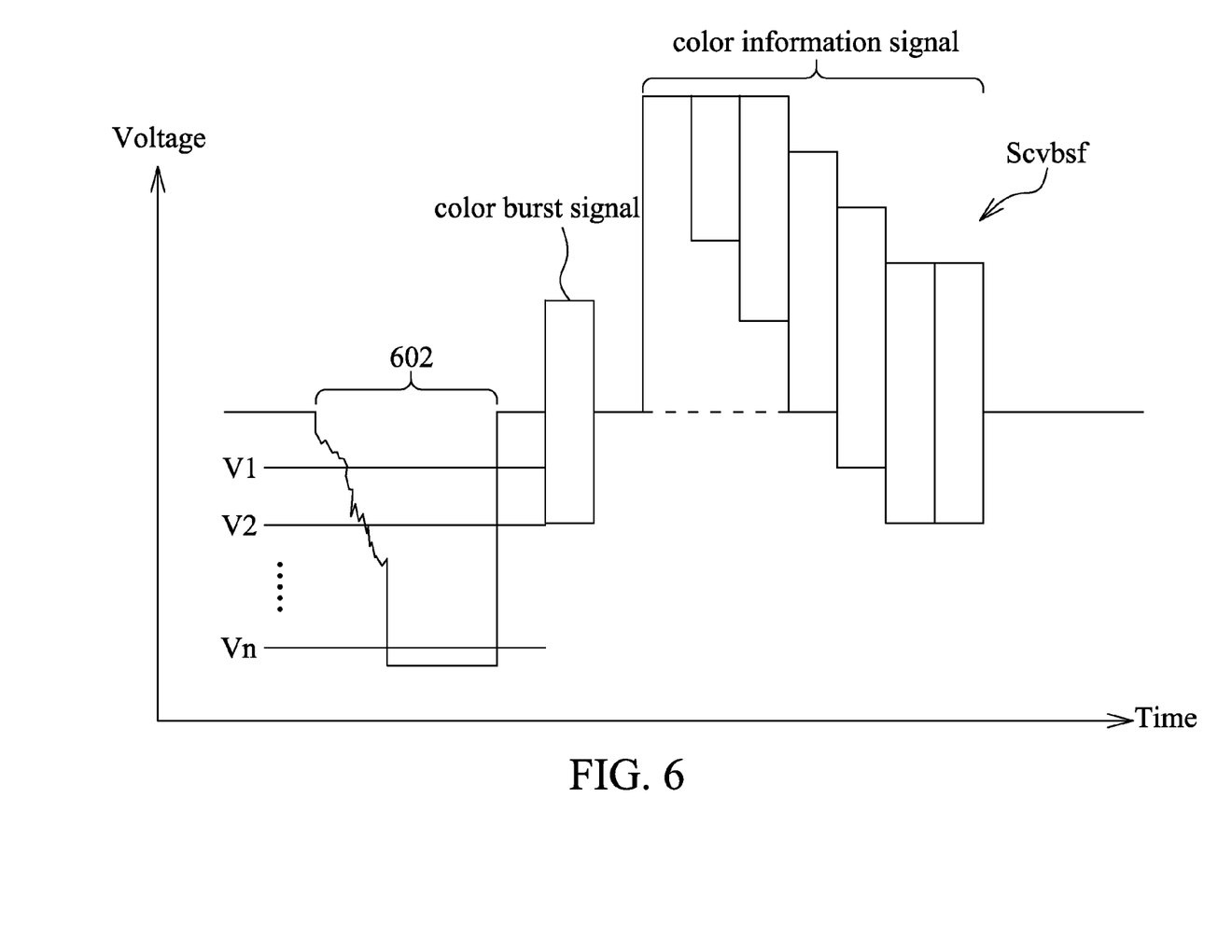
FIG. 6 is timing sequence of a filtered video signal of a voltage level control circuit and a plurality of different slicing voltage levels in accordance with another embodiment of the present invention.

When the voltage level control circuit 200 begins operating, the slicing circuit 202 slices the filtered video signal Scvbsf by sequentially implementing different slicing voltage levels V1 to Vn to respectively generate the corresponding first cock signals Ssync1 as shown in FIG. 5, which shows timing sequence of the filtered video signal Scvbsf of the voltage level control circuit 200 and the plurality of different slicing voltage levels V1 to Vn in accordance with an embodiment of the present invention. It is to be noted that, in this embodiment, the slicing circuit 202 slices a junction of a falling edge of a horizontal synchronization signal component 502 of the filtered video signal Scvbsf and a slicing voltage level to generate a first clock signal Ssync1; however, it shall not be construed as limiting the present invention. A person having ordinarily skills in the art can learn that the slicing circuit 202 may also generate the first cock signal Ssync1 by slicing a rising edge of the filtered video signal Scvbsf. In addition, the filtered video signal Scvbsf comprises the horizontal synchronization signal component 502, a color burst signal component and a color information signal. As shown in FIG. 5, since a part of the horizontal synchronization signal component 502, having lower voltage levels, of the filtered video signal Scvbsf are distorted, the ideal first clock signal Ssync1 can be generated when the slicing voltage level V1 is used as the slicing voltage level of the slicing circuit 202. Otherwise, referring to FIG. 6, since a part of a horizontal synchronization signal component 602, having higher voltage levels, of the filtered video signal Scvbsf are distorted, the ideal first clock signal Ssync1 can be generated when the slicing voltage level Vn is used as the slicing voltage level of the slicing circuit 202. FIG. 6 shows timing sequence of the filtered video signal Scvbsf of the voltage level control circuit 200 and the plurality of different slicing voltage levels V1 to Vn in accordance with another embodiment of the present invention. More specifically, when a slicing voltage level used by the slicing circuit 202 has distorted horizontal synchronization signal component as shown in FIG. 5 or FIG. 6, the generated first clock signal Ssync1 has more jitter components thereby enlarging the differences between the first clock signals Ssync1 and the second clock signals Ssync2. Therefore, in Step 401, in order to obtain an ideal slicing voltage level for slicing the fitered video signal Scvbsf, the slicing circuit 202 slices the horizontal synchronization signal components of the filtered video signal Scvbsf by sequentially switching the plurality of different slicing voltage levels V1 to Vn to determine an accumulation phase difference corresponding to each slicing voltage level V1 to Vn. When the slicing circuit 202 selects a slicing voltage level, and generates a first clock signal Ssync1 according to the voltage level, in Step 402, the detection circuit 203 detects a phase difference between the first clock signal Ssync1 and the second clock signal Ssync2. It is to be noted that, since the filtered video signal Scvbsf in FIG. 5 corresponds to timing sequence of a horizontal line, one phase difference between the first clock signal Ssync1 and the second clock signal Ssync2 is generated every time one horizontal line is inputted when a slicing voltage level is selected. In other words, when the slicing voltage level is selected, one corresponding horizontal synchronization clock signal is generated every time one horizontal line is inputted.

In Step 403, the phase difference accumulator 2072 accumulates the phase differences between the first clock signals Ssync1 and the second clock signals Ssync2 corresponding to the selected slicing voltage level. In this embodiment, the phase difference accumulator 2072 continuously accumulates phase differences caused by the second predetermined number of horizontal lines of each of the first predetermined number of fields of the video signal Scvbs. Therefore, in Step 404, the determining circuit 2073 determines whether the second predetermined number (i.e., a second number) of horizontal lines of each field are completely transmitted. When the determination result of Step 404 is positive, a phase difference accumulation result of the field corresponding to the selected slicing voltage level is generated; otherwise, the determining circuit 2073 continues to accumulate the phase differences caused by the horizontal lines of the field. In Step 407, when the first predetermined number of fields are completely transmitted, the determining circuit 2073 generates a phase difference accumulation result (e.g., a first phase difference accumulation result R1) corresponding to the selected slicing voltage level. In Step 408, the determining circuit 2073 determines whether all the plurality of different slicing voltage levels V1 to Vn of the slicing circuit 202 have ever been selected. When each of the slicing voltage level V1 to Vn has ever been selected, it means that the phase difference accumulation results R1 to Rn corresponding to the slicing voltage levels V1 to Vn are generated. A slicing voltage level corresponding to a minimum phase difference accumulation result of the phase difference accumulation results R1 to Rn is an optimal slicing voltage level. In Step 409, the determining circuit 2073 subtracts the minimum phase difference accumulation result from the phase difference accumulation results R1 to Rn, respectively, so as to obtain differences between each of the phase difference accumulation results R1 to Rn and the minimum phase difference accumulation result. The differences represent accumulation phase differences generated by using each of the slicing voltage levels V1 to Vn and the optimal slicing voltage level.

In Step 410, the determining circuit 2073 determines the target slicing voltage level Vt currently implemented by the target circuit 2074 and a corresponding specific phase difference accumulation value. A difference between the minimum phase difference accumulation result and the specific phase difference accumulation value can be obtained according to the differences generated in Step 409, and a comparison result is generated accordingly, and then to selectively generate an adjustment signal Sab according to the comparison result. More specifically, when the difference between the minimum phase difference accumulation result and the specific phase difference accumulation value is larger than a predetermined threshold, meaning that the difference between the specific phase difference accumulation value generated according to the target slicing voltage level Vt currently implemented by the slicing circuit 2074a of the target circuit 2074 and the minimum phase difference accumulation result generated according to the optimal slicing voltage level is larger than the predetermined threshold. At this point, the determining circuit 2073 generates the adjustment signal Sad for adjusting the target slicing voltage level Vt to the slicing voltage level corresponding to the minimum phase difference accumulation result. Accordingly, the slicing circuit 2074a of the target circuit 2074 slices the filtered video signal Scvbsf to an ideal level by adopting the updated slicing voltage level thereby obtaining an more accurate horizontal synchronization signal. In other words, horizontal synchronization signal components of the filtered video signal Scvbsf are sliced via the updated target slicing voltage level Vt to retrieve horizontal synchronization clock signals having a small jitter. When the difference between the minimum phase difference accumulation result and the specific phase difference accumulation value is not larger (or smaller than) the predetermined threshold, it means that the jitter of the horizontal synchronization clock signals generated by the target circuit 2074 adopting the target slicing voltage level Vt remains at a reasonable level. In order to prevent the voltage level control circuit 200 from excessively frequent changing the target slicing voltage level Vt, at this point, the determining circuit 2073 maintains the currently-adopted slicing voltage level, but not adjust the target slicing voltage level Vt adopted by the target circuit 2074. Therefore, the voltage level control circuit 200 can selectively dynamically adjust the target slicing voltage level Vt implemented by the target circuit 2074, so that a jitter of the generated horizontal synchronization clock signals can remain at a reasonable level thereby solving the problems of the conventional technology.

In conclusion, the voltage level control circuit 200 detects accumulation phase differences between the first clock signals Ssync1 and the second clock signals Ssync2 corresponding to each of the slicing voltage level V1 to Vn adopted by the slicing circuit 202 to selectively adjust the target slicing voltage level Vt implemented by the slicing circuit 2074a of the target circuit 2074, so that the jitter of the generated horizontal synchronization clock signals remains at a reasonable level.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A voltage level control circuit, for controlling a target slicing voltage level used to slice a video signal by a target circuit, the voltage level control circuit comprising:
    a slicing circuit, for slicing the video signal by sequentially adopting a plurality of slicing voltage levels to correspondingly generate a plurality of first clock signals;
    a detection circuit, for respectively detecting a plurality of phase differences between the first clock signals and a plurality of second clock signals to generate a plurality of detection signals;
    an oscillating circuit, for generating the second clock signals according to the detection signals, respectively; and
    an adjusting circuit, determining whether to adjust the target slicing voltage level according to the detection signals corresponding to the slicing voltage levels,
    wherein the video signal is a composite video blanking sync signal, and
    wherein the target slicing voltage level is for slicing horizontal synchronization signal components of the composite video blanking sync signal.

2. The voltage level control circuit as claimed in claim 1, wherein the adjusting circuit comprises:
    a phase difference accumulator, for accumulating the phase differences between the first clock signals and the second clock signals according to the detection signals to respectively generate a plurality of phase difference accumulation results corresponding to the slicing voltage levels; and
    a determining circuit, for generating an adjustment signal to the target circuit according to the phase difference accumulation results and a specific phase difference accumulation value to determine whether to adjust the target slicing voltage level, wherein the specific phase difference accumulation value corresponds to the target slicing voltage level currently implemented by the target circuit.

3. The voltage level control circuit as claimed in claim 2, wherein the adjusting circuit further comprises:
    a limitation circuit, coupled between the detection circuit and the phase difference accumulator, for adjusting one of the phase differences corresponding to the detection signals to a predetermined phase difference when the phase difference is larger than a predetermined upper limit value.

4. The voltage level control circuit as claimed in claim 2, wherein the determining circuit compares the phase difference accumulation results to select a specific phase difference accumulation result, compares the specific phase difference accumulation result with the specific phase difference accumulation value to generate a comparison result, and selectively generates the adjustment signal according to the comparison result.

5. The voltage level control circuit as claimed in claim 4, wherein the specific phase difference accumulation result is a minimum phase difference accumulation result of the phase difference accumulation results.

6. The voltage level control circuit as claimed in claim 4, wherein the determining circuit calculates a difference between the specific phase difference accumulation result and the specific phase difference accumulation value, and compares the difference with a predetermined threshold value to generate the comparison result.

7. A voltage level control method, for controlling a target slicing voltage level used to slice a video signal by a target circuit, the voltage level control method comprising:
    (a) slicing via a slicing circuit the video signal by sequentially implementing a plurality of slicing voltage levels to correspondingly generate a plurality of first clock signals;
    (b) respectively detecting a plurality of phase differences between the first clock signals and a plurality of corresponding second clock signals to generate a plurality of detection signals;
    (c) respectively generating the second clock signals according to the detection signals; and
    (d) determining whether to adjust the target slicing voltage level according to the detection signals corresponding to the slicing voltage levels,
    wherein the video signal is a composite video blanking sync signal, and wherein the target slicing voltage level is for slicing horizontal synchronization signal components of the composite video blanking sync signal.

8. The voltage level control method as claimed in claim 7, wherein Step (d) comprises:
(e) accumulating the phase differences between the first clock signals and the second clock signals according to the detection signals to respectively generate a plurality of phase difference accumulation results corresponding to the slicing voltage levels; and
(f) generating an adjustment signal according to the phase difference accumulation results and a specific phase difference accumulation value to determine whether to adjust the target slicing voltage level, wherein the specific phase difference accumulation value corresponds to the target slicing voltage level currently implemented by the target circuit.

9. The voltage level control method as claimed in claim 8, wherein Step (d) further comprises:
adjusting one of the phase differences to a predetermined phase difference when the phase difference is higher than a predetermined upper limit value.

10. The voltage level control method as claimed in claim 8, wherein Step (f) comprises:
(g) comparing the phase difference accumulation results to select a specific phase difference accumulation result;
(h) comparing the specific phase difference accumulation result with the specific phase difference accumulation value to generate a comparison result; and
(i) selectively generating the adjustment signal according to the comparison result.

11. The voltage level control method as claimed in claim 10, wherein the specific phase difference accumulation result is a minimum phase accumulation result of the phase difference accumulation results.

12. The voltage level control method as claimed in claim 10, wherein Step (h) comprises:
calculating a difference between the specific phase difference accumulation result and the specific phase difference accumulation value; and
comparing the difference with a predetermined threshold value to generate the comparison result.

* * * * *